US011967240B2

(12) United States Patent
Renaud et al.

(10) Patent No.: US 11,967,240 B2
(45) Date of Patent: Apr. 23, 2024

(54) SYSTEMS AND METHODS FOR FACILITATING ROADSIDE COMMERCIAL TRUCK SERVICE REQUESTS

(71) Applicant: Jitter Inc., Long Sault (CA)

(72) Inventors: Josh Renaud, Long Sault (CA); Dan Renaud, Long Sault (CA); Trevor Macdonald, Long Sault (CA)

(73) Assignee: Jitter Inc., Ontario (CA)

(*) Notice: Subject to any disclaimer, the term of this patent is extended or adjusted under 35 U.S.C. 154(b) by 231 days.

(21) Appl. No.: 17/676,311

(22) Filed: Feb. 21, 2022

(65) Prior Publication Data

US 2022/0270491 A1   Aug. 25, 2022

Related U.S. Application Data

(60) Provisional application No. 63/151,443, filed on Feb. 19, 2021.

(51) Int. Cl.
  *G08B 21/00* (2006.01)
  *G06Q 10/20* (2023.01)
  *G06Q 20/40* (2012.01)
  *G06Q 50/30* (2012.01)
  *G08G 1/00* (2006.01)

(52) U.S. Cl.
  CPC ............ *G08G 1/205* (2013.01); *G06Q 10/20* (2013.01); *G06Q 20/401* (2013.01); *G06Q 50/30* (2013.01)

(58) Field of Classification Search
  CPC ...... G08G 1/205; G06Q 10/20; G06Q 20/401; G06Q 50/30
  USPC .......................................................... 340/988
  See application file for complete search history.

(56) References Cited

U.S. PATENT DOCUMENTS

| | | | |
|---|---|---|---|
| 2012/0076437 A1* | 3/2012 | King ................... | G06Q 40/08 382/286 |
| 2014/0344152 A1* | 11/2014 | Allen ................... | G06Q 20/02 705/44 |
| 2016/0092962 A1* | 3/2016 | Wasserman ........... | H04M 3/487 705/26.7 |
| 2018/0232685 A1* | 8/2018 | Champ ................ | G06Q 10/083 |
| 2019/0172050 A1* | 6/2019 | Winters .............. | G06Q 20/3255 |
| 2020/0118444 A1* | 4/2020 | Wen .................... | H04L 67/51 |
| 2020/0184591 A1* | 6/2020 | Balu .................... | G07C 5/006 |

* cited by examiner

*Primary Examiner* — Mark S Rushing
(74) *Attorney, Agent, or Firm* — FisherBroyles, LLP; Susan M. Oiler (57) ABSTRACT

The present disclosure describes systems and methods for facilitating commercial truck service requests using a software application that can be downloaded to a user's device and used by a truck driver when their truck breaks down to request service and connect with a service provider. The application provides a single place for the driver to select and communicate with an appropriate service provider, receive approval from the driver's transportation company, and log details of the repair.

18 Claims, 11 Drawing Sheets

SYSTEMS AND METHODS FOR FACILITATING ROADSIDE COMMERCIAL TRUCK SERVICE REQUESTS

CROSS-REFERENCE TO RELATED APPLICATIONS

This application claims priority to U.S. Provisional Application No. 63/151,443, filed Feb. 19, 2021, the entire contents of which is incorporated herein by reference for all purposes.

TECHNICAL FIELD

The present disclosure relates to service requests, and in particular to facilitating road-side service requests for commercial trucking vehicles.

BACKGROUND

Commercial truck drivers are required to deliver loads by certain times or else their company could be fined for late deliveries. One hindrance to delivering loads on time is when a truck breaks down during a delivery away from trusted service providers.

When a truck breaks down, the driver contacts one or more service providers in the area to determine whether they are capable of providing the repair, speed of being able to provide the repair, etc. A particular problem exists when the truck breaks down away from distribution centers and/or major urban areas that the driver is familiar with and which has several service providers available, some of which may already be trusted service providers by the driver or trucking company. In less familiar locations, the driver is often unaware of the available service providers and their trustworthiness, and may often call around to various service providers to determine whether the service provider can provide the required service. The driver may also experience other complications such as difficulty in communicating with the service provider if different languages are spoken, etc.

Service providers may also experience similar difficulties with respect to communication, trustworthiness of the driver, etc. For example, one type of problem is when the service provider provides a repair service to the truck and the driver provides a fake or expired credit card number. The service provider is left with a decision of whether or not to pursue the driver/trucking company for the money owed, which may not be worthwhile based on the cost of the repair relative to the time and effort to recover the funds.

Notwithstanding the above-noted challenges regarding communication and trustworthiness of truck drivers and service providers, the entire process from contacting service providers to the service provider billing and receiving payment for the repair is both time-consuming and riddled with inefficiencies for both the driver and service provider alike. For example, a commercial truck driver that is driving for a trucking company will often have to get quotes and payments for repairs approved by an administrator of the company. Likewise, a service technician that is employed by a service provider company may also have to get quotes for the repair approved by an administrator at the service provider side before providing the quote to the driver. Further, at the end of the repair, the service provider technician is responsible for manually capturing payment information such as writing down a credit card number, and may also record other information such as a driver's license of the driver, a make/model/VIN of the truck, etc. These inefficiencies can take hours to complete and may not have sufficient oversight, which translates into time that is lost by the driver and service provider for driving or responding to other service calls.

Accordingly, systems and methods that facilitate truck service requests remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for facilitating road-side commercial truck service requests. The system also includes a processing unit; and a memory storing instructions, which, when executed by the processing unit, configure the system to: receive a service request from a user device for an associated truck, the service request identifying a type of service being requested; determine a location associated with the service request; determine, based on the service request and the determined location, one or more registered service providers capable of fulfilling the service request in an associated region and send identification of the registered one or more service providers to the user device; receive a user selection from the user device of a registered service provider from the one or more registered service providers; and initiate a communication between the user device and a service provider device corresponding to the selected registered service provider to facilitate the road-side commercial truck service. Other embodiments of this aspect include corresponding computer systems, apparatus, and computer programs recorded on one or more computer storage devices, each configured to perform the actions of the methods.

Implementations may include one or more of the following features. The system where the service request is generated in response to user input at the user device. The location of the service request is determined from a location of the user device. The type of service being requested is for any one or more of: refrigeration, tires, truck, trailer, and tow. The service request further includes any one or more of: photos related to the service request, a type of the associated truck, make of the truck, model of the truck, and vehicle identification number (VIN) of any one or more of a trailer, a tractor, and the truck. The system of any of the above, further including a database encompassing service provider information, the service provider information including types of service that respective service providers are capable of providing and locations of the respective service providers. The service provider information further includes a rating of the respective service providers, and where the system is further configured to include the rating of the one or more service providers in the information sent to the user device. The system is configured to charge a customer account associated with the user device a flat fee upon receiving the user selection of the service provider. The system is configured to generate a user account for a user of the user device based on user information received from the user, and the system is further configured to associate the user account with the customer account. The system is configured to generate the customer account for the user based on customer information received from the user, the customer information including payment information. The system is configured to generate the customer account for a customer based on customer information received from a company administrator, the customer information including payment information. The system is configured to initiate the communication between the user device and the service provider device with the company administrator. The system is further configured to: receive a quote from the service provider; receive acceptance of the quote from the company administrator; receive an indication that the service request has been fulfilled; charge the customer account for the service; and deposit payment for the service into a service provider account. The system is further configured to: generate a service record including the service request, the quote, and a payment receipt showing the charge to the customer account; and store the service record in association with the customer account. The system is configured to provide the company administrator access to the service record associated with the customer account. The system is configured to provide language translation in the communication. Implementations of the described techniques may include hardware, a method or process, or computer software on a computer-accessible medium.

One general aspect includes a method for facilitating road-side commercial truck service requests. The method also includes receiving a service request from a user device for an associated truck, the service request identifying a type of service being requested; determining a location associated with the service request; determining, based on the service request and the determined location, one or more registered service providers capable of fulfilling the service request in an associated region, and sending identification of the one or more registered service providers to the user device; receiving a user selection from the user device of a registered service provider from the registered one or more service providers; and initiating a communication between the user device and a service provider device corresponding to the selected registered service provider to facilitate the road-side commercial truck service. Other embodiments of this aspect include corresponding computer systems, apparatus, and computer programs recorded on one or more computer storage devices, each configured to perform the actions of the methods.

Implementations may include one or more of the following features. The method where the service request is generated in response to user input at the user device. The location of the service request is determined from a location of the user device. The type of service being requested is for any one or more of: refrigeration, tires, truck, trailer, and tow. The service request further includes any one or more of: photos related to the service request, a type of the associated truck, make of the truck, model of the truck, and vehicle identification number (VIN) of any one or more of a trailer, a tractor, and the truck. The method further including accessing a database encompassing service provider information, the service provider information including types of service that respective service providers are capable of providing and locations of the respective service providers. The service provider information further includes a rating of the respective service providers, and where the system is further configured to include the rating of the one or more service providers in the information sent to the user device. The method further including charging a customer account associated with the user device a flat fee upon receiving the user selection of the service provider. The method further including generating a user account for a user of the user device based on user information received from the user, and the associating the user account with the customer account. The customer account is generated for the user based on customer information received from the user, the customer information including payment information. The customer account is generated for a customer based on customer information received from a company administrator, the customer information including payment information. The method further including initiating the communication between the user device and the service provider device with the company administrator. The method further including: receiving a quote from the service provider; receiving acceptance of the quote from the company administrator; receiving an indication that the service request has been fulfilled; charging the customer account for the service; and depositing payment for the service into a service provider account. The method further including: generating a service record including the service request, the quote, and a payment receipt showing the charge to the customer account; and storing the service record in association with the customer account. The method further including providing the company administrator access to the service record associated with the customer account. The method further including providing language translation in the communication. Implementations of the described techniques may include hardware, a method or process, or computer software on a computer-accessible medium.

The present disclosure describes systems and methods for facilitating road-side commercial truck service requests using a software application that can be downloaded to a user's mobile device and used by a commercial truck driver when their truck breaks down to request service and connect with a service provider. The application provides a single place for the driver to select and communicate with an appropriate service provider, receive approval from the driver's transportation company, and log details of the repair.

Advantageously, the application provides a trusted network for trucking companies, truck drivers, and service providers to connect, and facilitates all aspects of the service transaction by simplifying administrative processes, eliminating back-and-forth, and automating payment. The application maintains a database of service provider information including types of service that respective service providers are capable of providing and the service provider locations, and may further comprise ratings of respective service providers generated based on user feedback of prior repairs, etc. The application further maintains and authenticates user and customer accounts and facilitates payment from the user/customer to the service provider. The driver and trucking companies can thus feel confident knowing that they can request reliable and competent service from service providers, including in areas that the driver is unfamiliar with, without having to spend time calling around to various service providers looking for service. The service providers can also feel confident that they will receive payment for the service that is performed. Moreover, inefficiencies that exist in the service transactions taking place today, such as receiving administrator approval, manually capturing payment information, etc., are reduced or eliminated by using the application. Details related to the service request are captured through the application and can be stored for subsequent reference.

Embodiments are described below, by way of example only, with reference to FIGS. 1-11.

Figure 1:
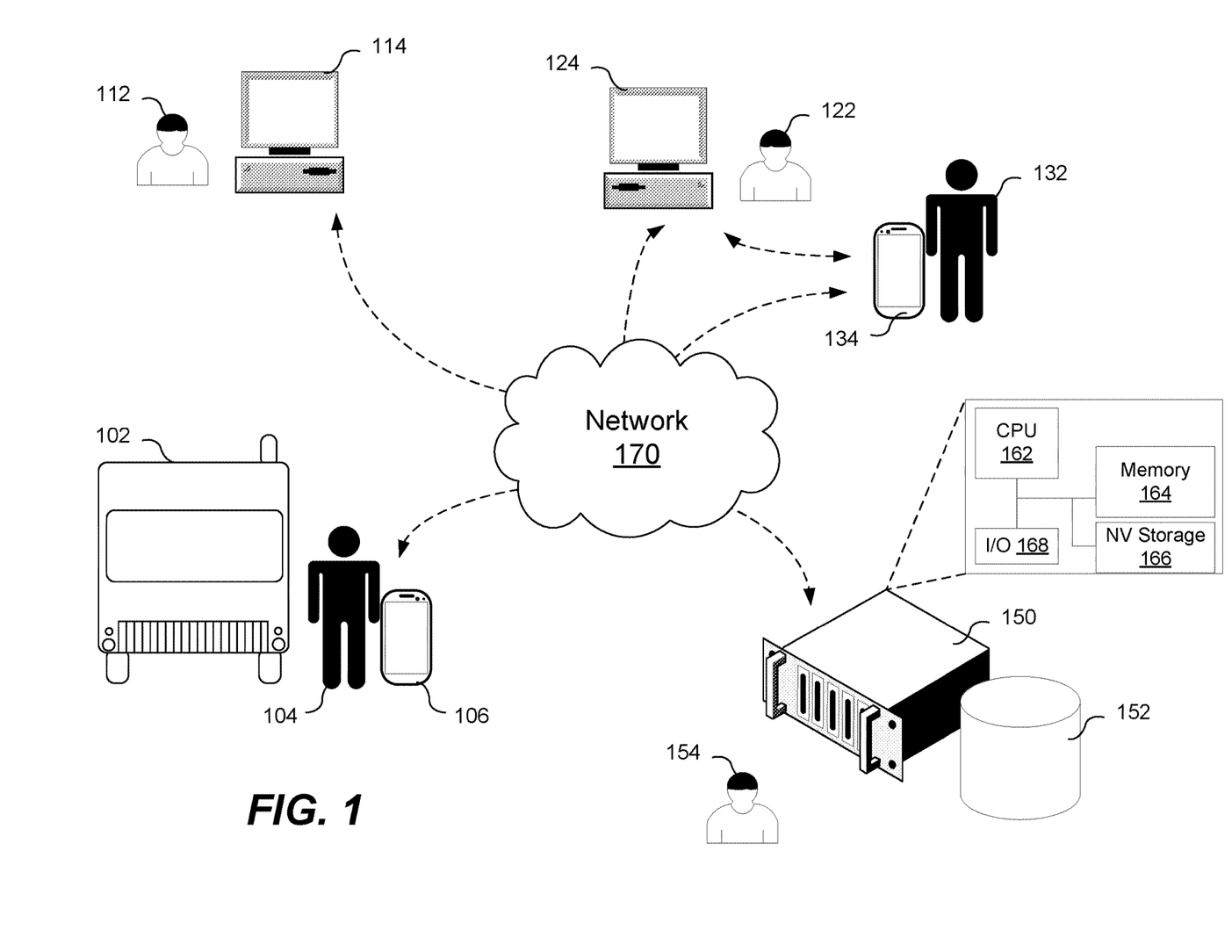
FIG. 1 shows a representation of a system for facilitating commercial truck service requests.

FIG. 1 shows a representation of a system for facilitating commercial truck service requests. When a commercial truck 102 breaks down, driver 104 opens application running on a user's mobile computing device 106 to request service. The system is provided by a facilitator system acting as an intermediary in determining approved regional service providers and processing payment between parties. The user's (driver) computing device 106 is shown in FIG. 1 as being a mobile phone, however it would be appreciated that the user's computing device 106 is not limited to such and may for example be a smartphone tablet, laptop, etc. having wireless communications capability. The driver 104 may have a pre-existing user account for the application that they log into on the user computing device 106, or they may create a new user account. The user account settings may capture information such as name, address, e-mail address, phone number, and preferred language. If the driver 104 works for a trucking company, the user account may be associated to a customer account for the trucking company and may also be associated with one or more vehicles. If the driver 104 is a sole owner/operator, the user account may correspond to the customer account and contains payment information provided by the user such as a valid credit card number and associated information. The application may perform appropriate verification to authenticate the payment information provided.

Customer account information may be provided by an administrator 112 of a trucking company and/or a leasing company that owns or that is responsible for the truck 102. The customer account information may be provided through an application running on administrator computing device 114, and used to create a customer account. The customer account information may comprise payment information, such as a credit card number, customer debit account information, etc. for payments to be made out of on behalf of their drivers. The application may perform appropriate verification to authenticate the payment information provided. The company administrator 112 may also verify requests to associate user accounts with the customer account, and/or the company administrator 112 may create user accounts on behalf of their drivers.

The application may be hosted on one or more servers providing facilitator functionality, represented by facilitator server 150 in FIG. 1, and the system may comprise one or more databases, represented by database 152 in FIG. 1, to store user account information, customer account information, and other information such as service provider information, service records, etc., as further described herein. The facilitator server functionality can be distributed (cloud service) and provided by multiple units or incorporate functions provided by other services. Communication between the user computing device 106, administrator computing device 114, and other computing devices such as service provider computing devices, may take place over a network 170 such as the Internet. The server comprises a processing unit, shown in FIG. 1 as a CPU 162, a non-transitory computer-readable memory 164, non-volatile storage 166, and an input/output (I/O) interface 168. The non-transitory computer-readable memory 164 comprises instructions that, when executed by the processing unit, configure the server to perform certain functionality in accordance with the disclosure herein. The I/O interface 168 may comprise a communication interface that allows the facilitator server 150 to communicate over the network 170 and to access the database 152. The I/O interface 168 may also allow a back-end user 154 to access the facilitator server 150 and/or database 152.

When truck 102 breaks down, the driver 104 may request service through the application on their computing device 106. The driver 104 may provide input that identifies a type of service being requested, and may for example be selected from a list of: refrigeration, tires, truck, trailer, and tow. The service request may also comprise a location of the service request. The location may be entered manually or captured from a geolocation of the computing device 106 and the application may access the location while the application is open on the user device 106 and include the location in the service request being sent through the application. The service request may also comprise any one or more of: photos related to the service request such as a picture of the component that needs repair, a type of the commercial truck (e.g. diesel or electric), a make of the truck 102, a model of the truck 102, and a vehicle identification number (VIN) of any one or more of a trailer, a tractor, and the truck 102. Capturing the VIN may be particularly advantageous as the application serves as the payment facilitator between the customer and the service provider, and the VIN may thus allow the app provider to take out a lien against the customer using the VIN if there is any issues with the payment of service. In some implementations, some information such as the make of the truck, model, of the truck, and/or the VIN may be associated to the user account and included in the service request.

When the facilitator server 150 receives the service request, the server determines one or more service providers capable of fulfilling the service request based on the type of service being requested and the location of the service request. Advantageously, this narrows the driver's search for finding the appropriate service provider based on the service request, and mitigates the driver 104 from having to call around to various service providers, some of which may not even be capable of providing the service required. The database 152 may comprise service provider information that includes types of service that respective service providers are capable of providing and locations of the respective service providers. This service provider information may be provided by service providers who wish to register for and use the application. The service provider information stored in the database may further comprise a rating of the respective service providers, which may be generated based on feedback of previously fulfilled service requests. The facilitator server 150 may retrieve one or more service providers that are capable of fulfilling the service request in the location, and sends information of the one or more service providers to the user computing device 106 for presentation to the driver 104. The information sent to the user computing device 106 may comprise a name of the service providers, a location of the service providers relative to the service location, and a rating of the service providers. In some implementations, the one or more service providers may be presented to the driver 104 in the form of a list. In some implementations, the location of the service providers relative to the service location may be overlaid on a geographical map.

The driver 104 may review the information of the service providers that are capable of fulfilling the service request and make a selection of a service provider. Upon receipt of the selection at the facilitator server 150 by the user computing device 106, the facilitator server 150 initiates a communication between the user computing device 106 and the service provider, which may for example be a service provider administrator computing device 124 being operated by a service provider administrator 122, or a service provider technician computing device 134 operated by a service provider technician 132. For example, if the service provider technician 132 is a sole owner/operator of their service business, the communication may be initiated directly between the driver 104 and the service provider technician 132. In other instances, a larger service provider company may have several technicians, and the communication may be initiated between the driver 104 and the service provider administrator 122, and the service provider administrator may in turn communicate separately with the service provider technician to dispatch them to the service location.

The communication between the driver and the service provider administrator 122 and/or service provider technician 132 takes place via the application hosted by the facilitator server 150. The communication allows the driver 104 to communicate additional information to the service provider, such as more details of the service request, directions to locating the truck 102, etc. When the service provider selection is received and the communication is initiated, the application may also automatically include the trucking company administrator 112 in the communication so that they can see/approve aspects of the service request.

Advantageously, the facilitator server 150 may be configured to provide language translation in the communication via the application via a messaging or chat session, or associated with a short-message-service (SMS) or multimedia-messaging-service (MMS) texting session. For example, users of the application may select their preferred language when using the application, and communication inside the application may automatically be translated to their preferred language, for example, between English, French, Spanish, Punjabi, etc.

The facilitator server 150 may automatically charge the payment information associated with the customer account a flat fee, such as $250, upon receipt of the selection of the service provider. This ensures that the service provider is compensated for driving out to the service location. The service provider technician 132 drives to the service location to review the service required for the truck 102. If the service provider technician 132 determines that they are unable to fulfil the service request, then the service request is closed and communication between the driver 104 and the service provider is ended.

In some implementations, the facilitator server 150 may be configured to analyze closed service requests and flag drivers, companies, and/or service providers that may be intentionally closing the service request to negotiate fulfilling the service request outside of the application. For example, the driver may offer to pay up front in cash, or the service provider technician may offer to charge a slightly lower fee than they would if using the application. Analyzing closed service requests for patterns of repeated closed service requests may help to flag abuse of the application.

If the service provider technician 132 can fulfill the service request, they generate a quote, which may be communicated to the service provider administrator 122. The quote may be sent through the application to the driver 104 and/or trucking company administrator 112. The application may automatically apply a pre-defined mark-up to the quote as a charge for facilitating the service request upon receiving the quote from the service provider and before sending the quote to the trucking company. The trucking company administrator 112 may in particular be responsible for approving any quotes being paid for service being performed on a company truck.

When the quote is accepted, the service provider technician 132 performs the appropriate service to fulfil the service request. When the service is complete, the service provider technician 132 notifies the service provider administrator 122 that the work is done, and the service provider administrator 122 provides an indication through the application to the driver 104 and/or trucking company administrator 112 that the service is complete. Of course, where the service provider technician 132 is an owner/operator and there is no service provider administrator, the service provider technician 132 provides the indication through the application. The driver 104 and/or trucking company administrator 112 can provide an indication through the application to confirm that the service is complete. When the facilitator server 150 receives this confirmation from the driver 104 and/or trucking company administrator 112, the facilitator server 150 processes payment from the user/customer account and provides payment equivalent to the quote (minus any flat fee already paid) to the service provider. In instances where the facilitator server 150 does not receive confirmation from the driver 104 and/or trucking company administrator 112 that the service is complete, the facilitator server 150 may automatically charge the customer account after a predetermined amount of time (e.g. 30 minutes) and/or upon detection that the truck 102 has moved (e.g. by tracking the location of the driver's computing device 106 or vehicle). The trucking customer administrator and service provider administrator can access communications between the driver and technician. In addition approvals may be required by the administrators to approve estimates, commence work, and process billing. In addition the administrators may be able to audit and view communications and at a later date. Ratings of the service providers may also be collected on completion.

The facilitator server 150 may generate a service record comprising information such as the service request, the quote, and a payment receipt showing the charge to the customer account. The service record may be stored in the database 152 in association with the customer account for subsequent access by the trucking company administrator. Not only does the service record provide a record of the transaction, but it can also be analyzed to glean various insights for the trucking company by the company administrator 112 (and/or the back-end user 154). For example, analysis of the data may be used to determine makes/models of trucks that break down frequently, types of repairs, average costs of repairs, average repair costs across a fleet of trucks, common locations of truck breakdowns, etc. The company administrator 112 may be able to identify a particular truck(s) that break down frequently or have expensive repairs and thus may wish to remove these from their fleet. Further, the back-end user 154 may be able to determine where there is a lack of service, and help service providers plan new developments.

While the foregoing description has provided a general description of how drivers, company administrators, service provider administrators, and service providers technicians may interact with an application provided by the facilitator server 150, a person skilled in the art will readily appreciate that the functionality of the application is not limited to only the foregoing functionality and that various other capabilities may be provided through the application. For example, the interface available to company administrators may allow the administrator to identify/track trucks, truck status, etc. Further, the interface available to service providers may allow for tracking service provider technicians, and the location of the service provider technician may be provided to the driver after service has been requested.

Figure 2:
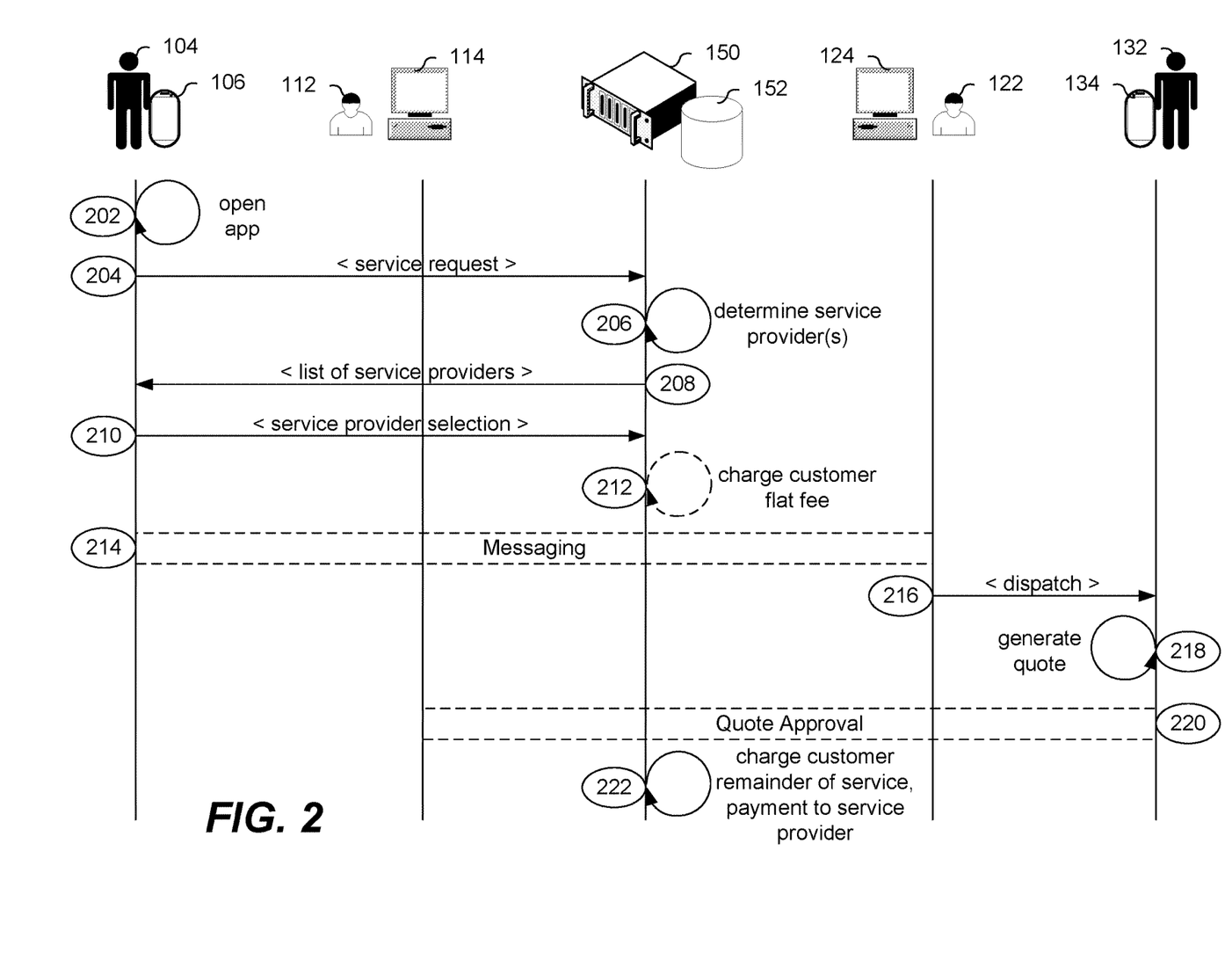
FIG. 2 shows a communication flow diagram for facilitating commercial truck service requests.

FIG. 2 shows a communication flow diagram for facilitating commercial truck service requests. When the truck driver 104 is in need of service for their truck, the driver 104 opens the application (202) and submits a service request (204). The service request is received at the facilitator server 150, which accesses database 152 to determine service provider(s) that are capable of fulfilling the service request and that are within an appropriate service area such as a geographic region relative to the location of the truck (206), and sends a list of the service provider(s) capable of fulfilling the service request to the driver 104. The driver 104 makes a selection of a service provider through the application at the user computing device 106, which is received at the server (210).

Selection of the service provider begins a service call. The facilitator server 150 may automatically process a payment to charge the customer account a flat fee to cover the cost of a service provider technician being sent to the truck (212). The facilitator server 150 initiates a communication between the driver 104 and the service provider through the application (214). The messaging is shown in FIG. 2 as being between the driver 104, the trucking company administrator 112, and the service provider administrator 122, though it would be appreciated that the communication may be directly with the service provider technician 132, and that there may be no company administrator 112 (for example if the driver 104 is an owner/operator) and no service provider administrator 122. In the communication flow diagram of FIG. 2, the service provider administrator 122 dispatches a service provider technician 132 to the location of the truck to perform the service (216).

The service provider technician 132 arrives at the location of the truck and generates a quote for the service (218). The quote is approved (220), which may for example involve the service provider technician 132 sending the quote to the service provider administrator 122 for internal approval, and the service provider administrator 122 sending the quote through the application to the trucking company administrator 112 for customer approval. Once the service request is complete, which may be determined based on the service provider technician 132 or service provider administrator 122 sending an indication through the application that the service is complete, and the truck driver 104 or the trucking company administrator 112 confirming that the service is complete, the facilitator server 150 processes a payment to charge the customer account for the service, and processes payment to the service provider (222).

Figure 3:
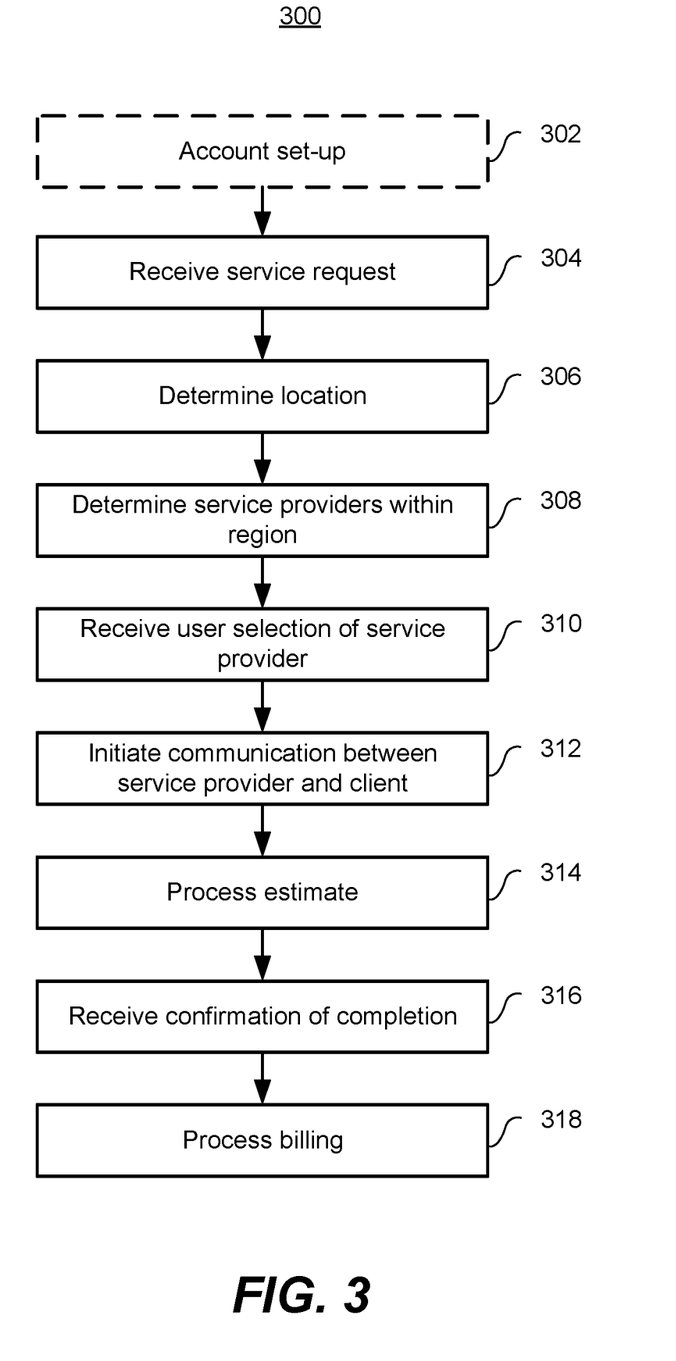
FIG. 3 shows a method for facilitating commercial truck service requests.

FIG. 3 shows a method 300 for facilitating commercial truck service requests. The method 300 may be performed by a system supporting the application, such as the facilitator server 150 and database 152 shown in FIG. 1. The computer-readable instructions stored in the memory may configure the system to perform the method 300.

The method, performed by a facilitator service comprises setting-up a user account for a user, a customer account for a customer that is associated with the user account, and a service provider account for at least one service provider (302). Note that the customer account may be the same as the user account if the user is an owner/operator, for example. The accounts are set-up using information received from various computing devices over a network. The accounts may also be modified and updated over time.

A service request is received (304) by the facilitator. The service request is received at the server hosting the application in response to user input at the user device. The service request identifies a type of service being requested. The location associated with the service request is determined (306), which may for example be determined from a location of the user device, a vehicle transponder or manual identification. The user input at the user device to generate the service request may comprise a selection of a type of service, such as service for any one or more of: refrigeration, tires, truck, trailer, and tow which is utilized to determine applicable service providers. The user may also include additional details with the service request, such as photos related to the service request. The user may also input details such as a type of the commercial truck (e.g. diesel or electric), a make of the truck, model of the truck, and vehicle identification number (VIN) of any one or more of a trailer, a tractor, and the truck, and/or these details may already be associated with the user account and automatically included with the service request.

One or more service providers are determined that are capable of fulfilling the service request (308) within an appropriate service area. The system may comprise a database comprising service provider information, the service provider information including types of service that respective service providers are capable of providing and locations of the respective service providers. Based on the type of service being requested and the location of the service request, one or more service providers may be determined that are capable of fulfilling the service request and that are within a certain proximity to the location of the service request. Information of the one or more service providers is sent to the user device. The service provider information may also comprise a rating of the respective service providers, and the rating of the one or more service providers may be included in the information sent to the user device.

A user selection of a service provider is received from the user device (310), and communication is initiated in the application between the user device and the service provider device corresponding to the selected service provider (312). The communication can be provided within the application or via an external communication channel such as SMS or MMS. The communication channel may also include administrators of the trucking company or service provider to facilitate monitoring or approval of work. An estimate to perform the work is processed from the service provider (314) which can be approved by the driver or an associated administrator. Payment for the transaction can be processed upon approval. Once the work is completed and confirmation received (316) the billing of the work can be processed (318) via the facilitator acting as an intermediary between parties without requiring direct payment processing between the service provider and the trucking company.

Figure 4:
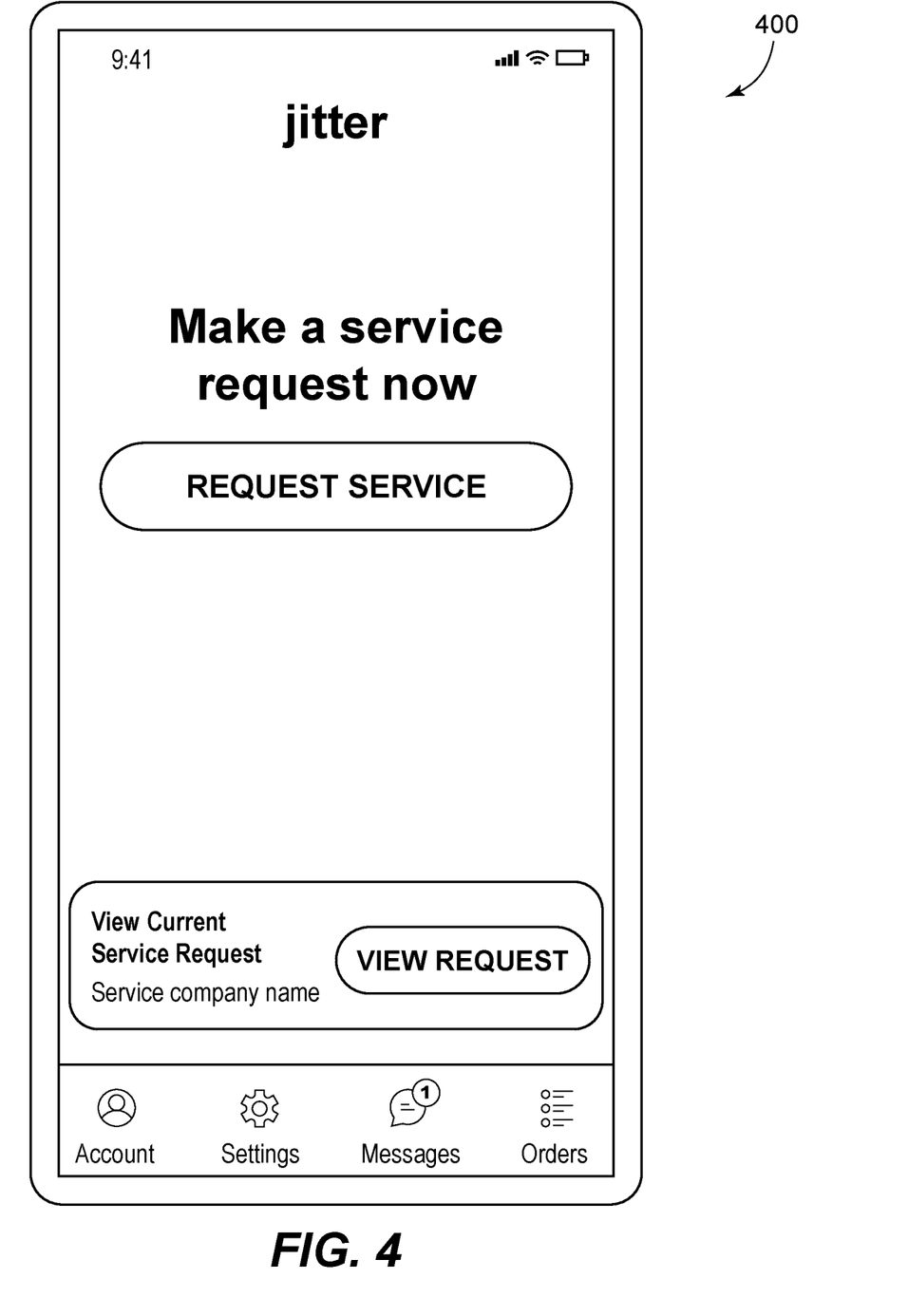
FIGS. 4 to 11 show examples of user interfaces in an application for making service requests.
Figure 5:
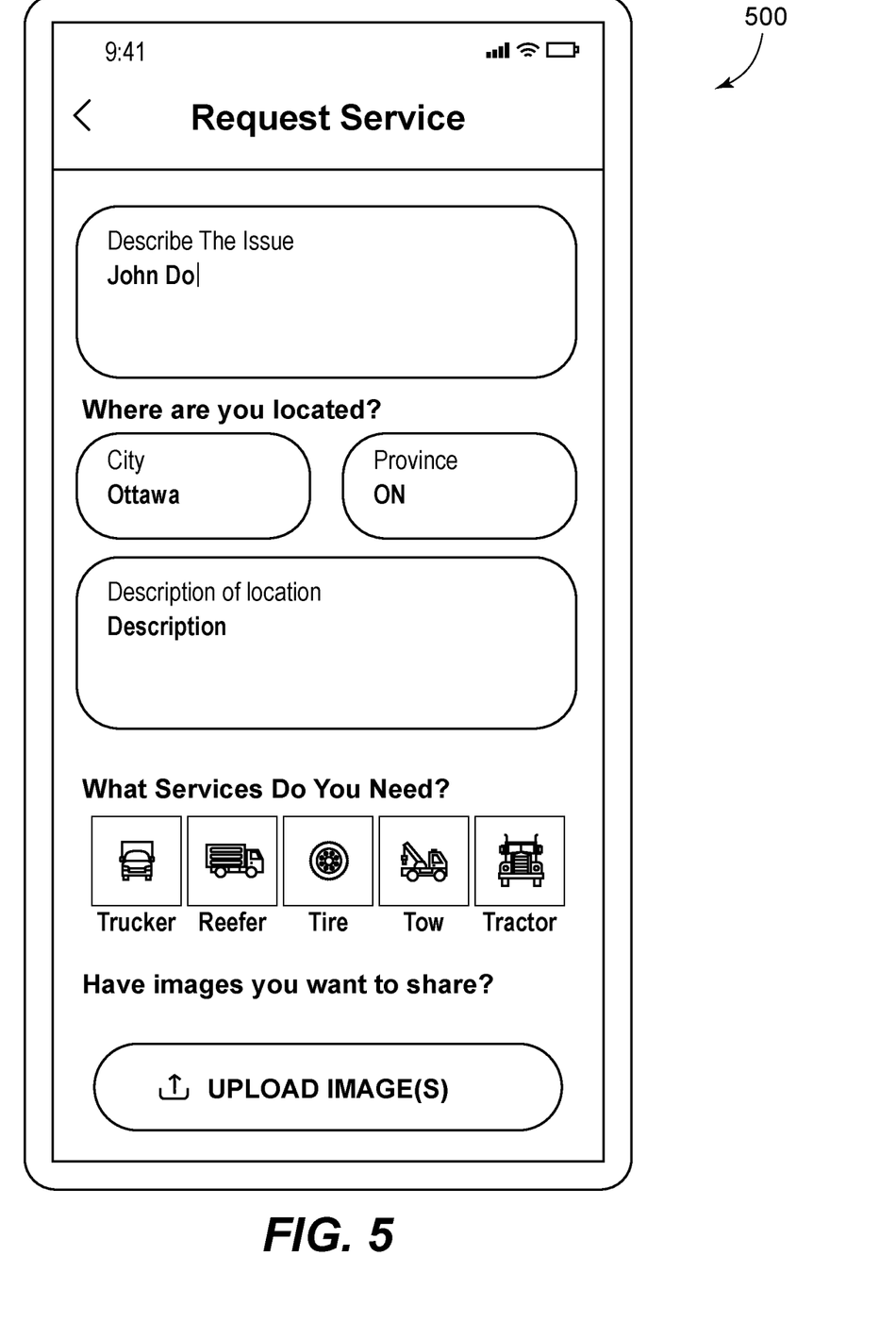
Figure 6:
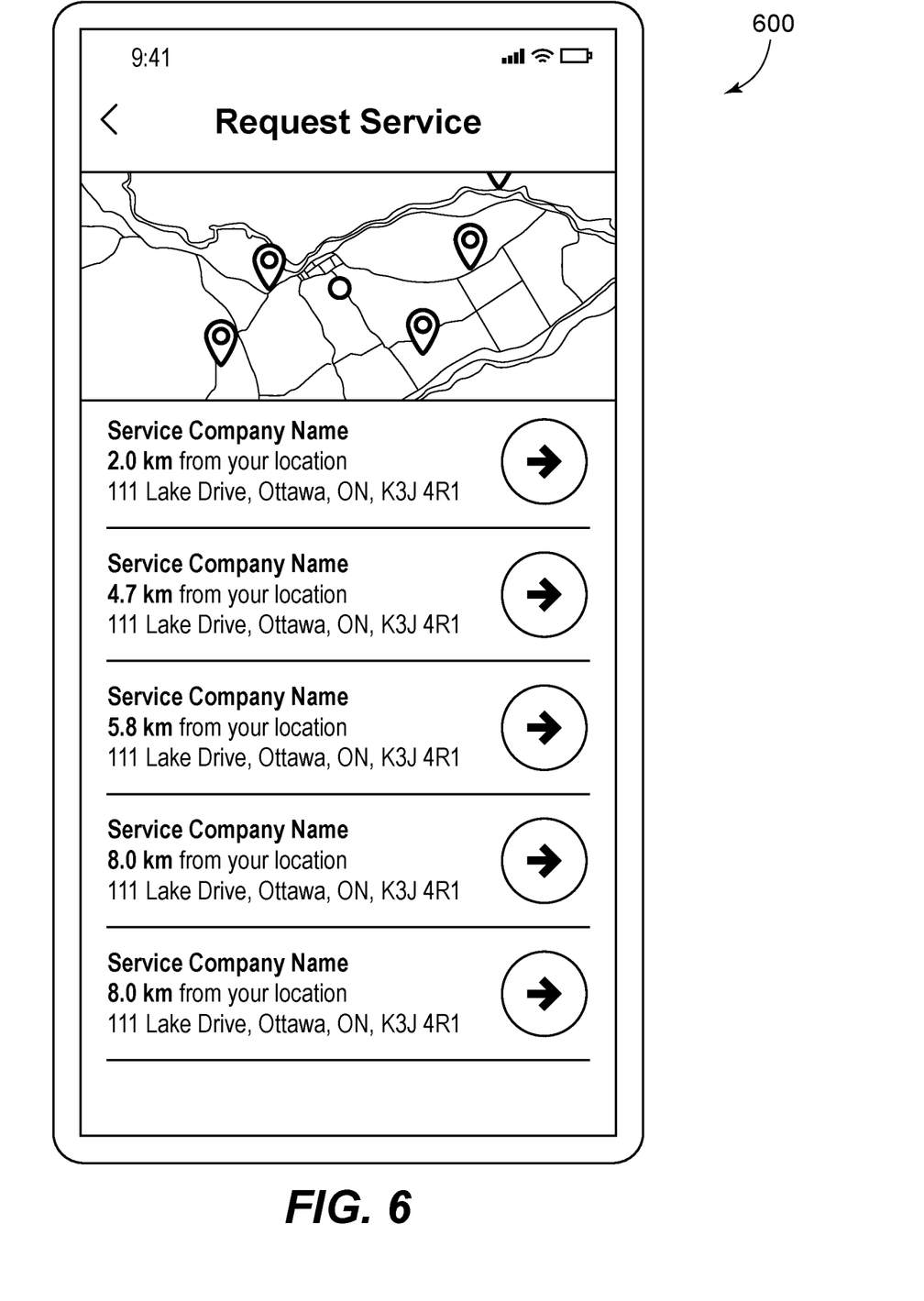
Figure 7:
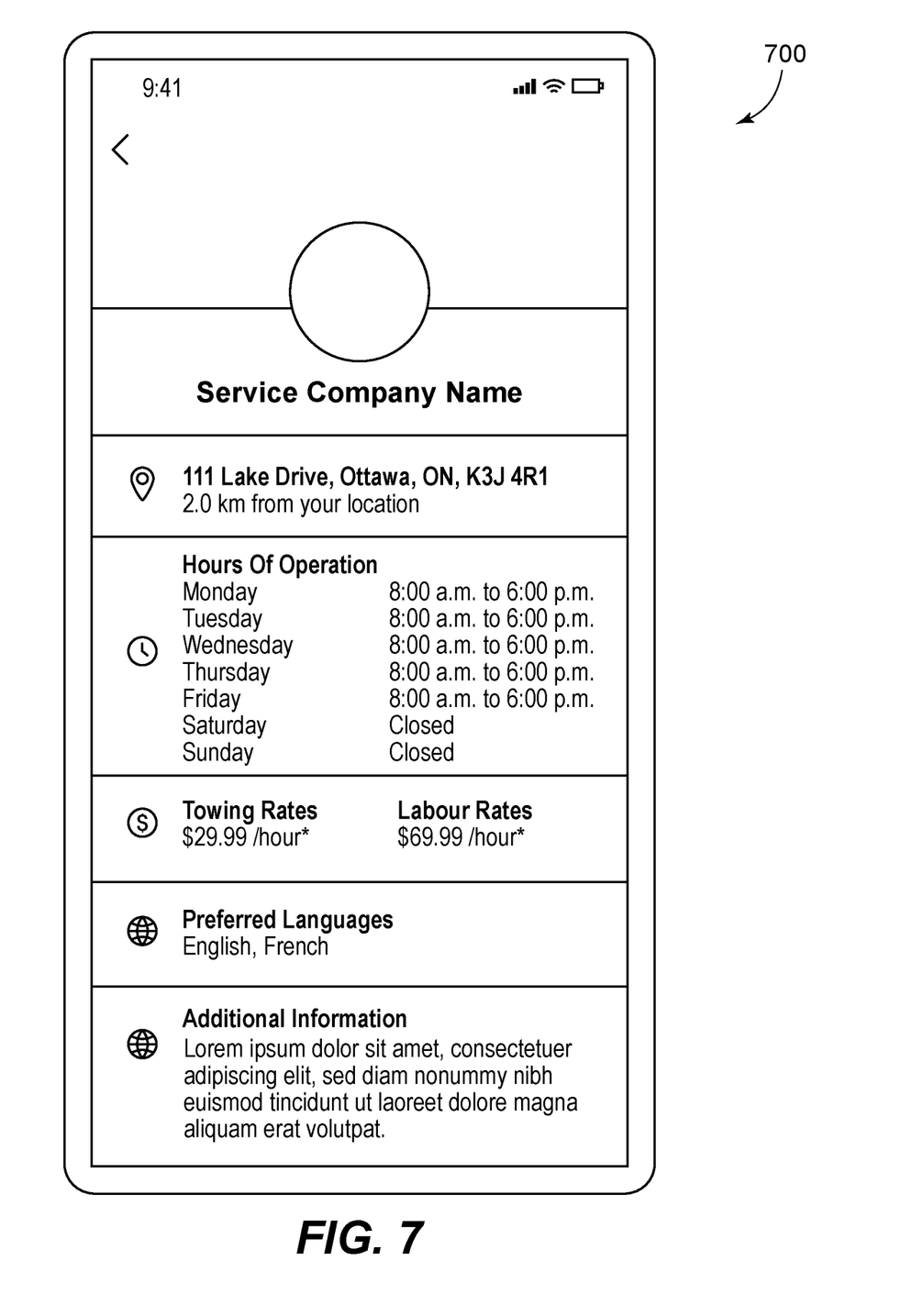
Figure 8:
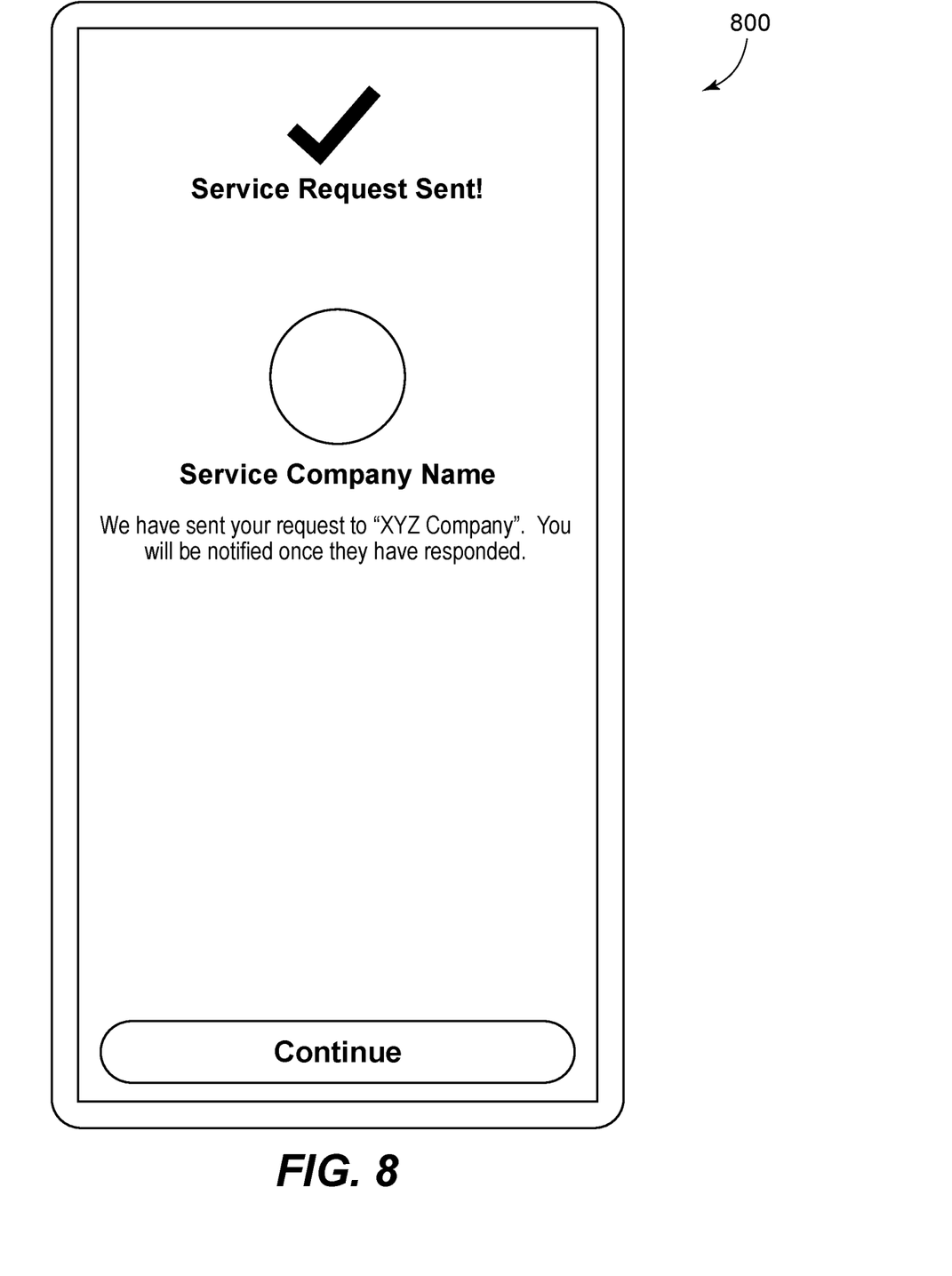
Figure 9:
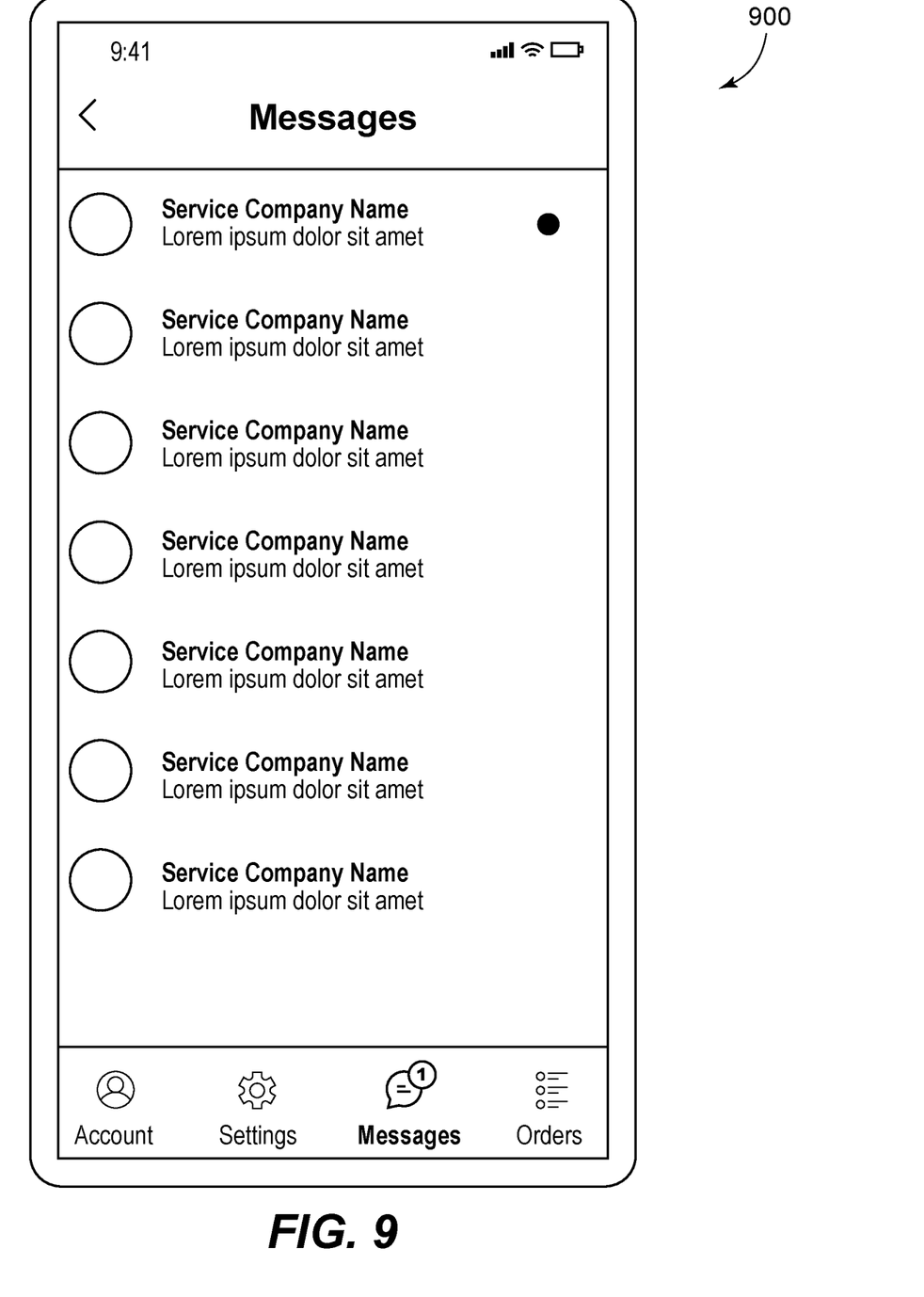
Figure 10:
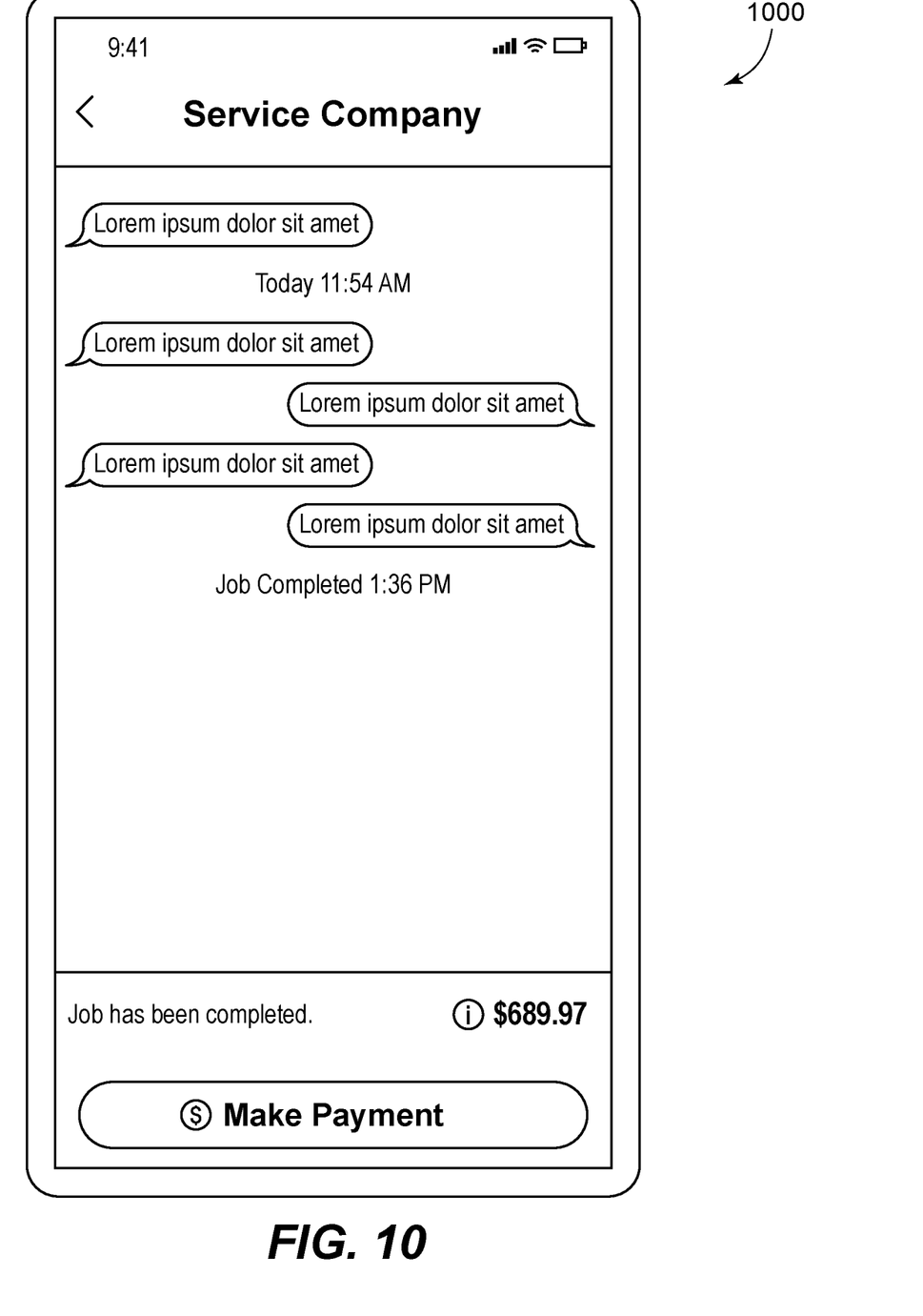
Figure 11:
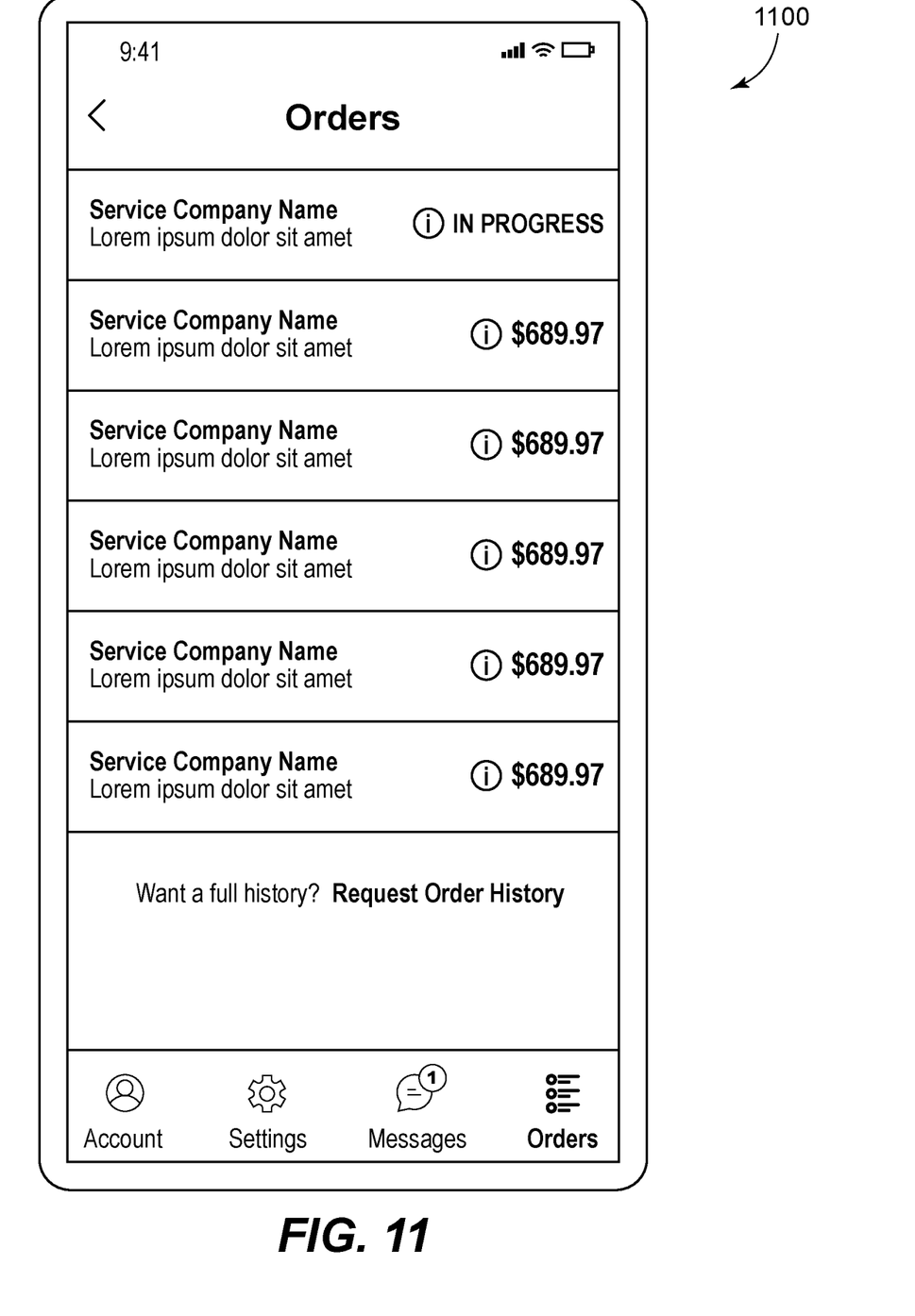

FIGS. 4 to 11 show examples of user interfaces in an application for making service requests. The user interface 400 shown in FIG. 4 may represent an example of a home screen in the application, which facilitates the user to request service and/or view a current service request. As shown in FIG. 4, from this screen the user may make a selection to request service or view a current service request, among other things. The user interface 500 shown in FIG. 5 may represent an example of a page for requesting service. As shown in FIG. 5, the user may be able to input text to describe the issue, provide the truck's location, select a type of service(s) from a list of truck, reefer, tires, tow, and tractor, and upload image(s). The user interface 600 shown in FIG. 6 may represent an example of service provider information that the user sees in response to requesting service (i.e. the one or more service providers that are capable of fulfilling the service request). As shown in FIG. 6, the one or more service providers that are capable of fulfilling the service request may be presented on user interface 600 as a list with information indicating a distance relative to the service location, and/or presented visually on a map. The user interface 700 shown in FIG. 7 may represent an example of additional service provider information that is provided to a user upon selection of a service company from the screen in FIG. 6, and also allows a user to send a request for service to the service company. For example, as shown in FIG. 7 the additional service provider information may comprise location information, hours of operation, rates, preferred languages, etc. The user interface 800 shown in FIG. 8 may represent an example of a screen presented to the user after sending a request for service to the service company, such as by selecting to send a service request from the screen in FIG. 7. The user interface 900 shown in FIG. 9 may represent an example of current and previous messages between the user and different service companies (for example, containing communication between the user and service provider during different service requests). The user interface 1000 shown in FIG. 10 may represent a particular message thread with a service company, which in the example of FIG. 10 also provides an indication that the job has been completed and provides with an option to make payment for the service. The user interface 1100 shown in FIG. 11 may represent an example of an order history showing current and previous service orders.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The invention claimed is:

1. A system for facilitating road-side commercial truck service requests, comprising:
a processing unit; and
a memory storing instructions, which, when executed by the processing unit, configure the system to:
receive a service request from a user device for an associated truck, the service request identifying a type of service being requested;
determine a location associated with the service request;
determine, based on the service request and the determined location, one or more registered service providers capable of fulfilling the service request in an associated region, and send identification of the one or more service registered providers to the user device;
receive a user selection from the user device of a registered service provider from the one or more registered service providers;
initiate a communication between the user device and a service provider device corresponding to the selected registered service provider to facilitate the service request;
receive a quote from the service provider;
receive acceptance of the quote from a company administrator;
charge a customer account for the service after a predetermined amount of time and detection that the associated truck has moved; and
deposit payment for the service into a service provider account.

2. The system of claim 1, wherein the location of the service request is determined from a location of the user device.

3. The system of claim 1, wherein the type of service being requested is for any one or more of: refrigeration, tires, truck, trailer, and tow.

4. The system of claim 1, wherein the service request further comprises any one or more of: photos related to the service request, a type of the associated truck, make of the truck, model of the truck, and vehicle identification number (VIN) of any one or more of a trailer, a tractor, and the truck.

5. The system of claim 1, further comprising a database encompassing service provider information, the service provider information including types of service that respective service providers are capable of providing and locations of the respective service providers.

6. The system of claim 1, wherein the system is configured to generate a user account for a user of the user device based on user information received from the user, and the system is further configured to associate the user account with the customer account.

7. The system of claim 6, wherein the system is configured to generate the customer account for the user based on customer information received from the user, the customer information comprising payment information.

8. The system of claim 6, wherein the system is configured to generate the customer account for a customer based on customer information received from the company administrator, the customer information comprising payment information.

9. The system of claim 1, wherein the system is further configured to:
generate a service record comprising the service request, the quote, and a payment receipt showing the charge to the customer account; and
store the service record in association with the customer account.

10. A method for facilitating road-side commercial truck service requests, comprising:
- receiving a service request from a user device for an associated truck, the service request identifying a type of service being requested;
- determining a location associated with the service request;
- determining, based on the service request and the determined location, one or more registered service providers capable of fulfilling the service request in an associated region, and sending identification of the one or more registered service providers to the user device;
- receiving a user selection from the user device of a registered service provider from the one or more registered service providers; and
- initiating a communication between the user device and a service provider device corresponding to the selected registered service provider to facilitate the service request;
- receiving a quote from the service provider;
- receiving acceptance of the quote from a company administrator;
- charging a customer account for the service after a predetermined amount of time and detection that the associated truck has moved; and
- depositing payment for the service into a service provider account.

11. The method of claim 10, wherein the location of the service request is determined from a location of the user device.

12. The method of claim 10, wherein the type of service being requested is for any one or more of: refrigeration, tires, truck, trailer, and tow.

13. The method of claim 10, wherein the service request further comprises any one or more of: photos related to the service request, a type of the associated truck, make of the truck, model of the truck, and vehicle identification number (VIN) of any one or more of a trailer, a tractor, and the truck.

14. The method of claim 10, further comprising accessing a database encompassing service provider information, the service provider information including types of service that respective service providers are capable of providing and locations of the respective service providers.

15. The method of claim 10, further comprising generating a user account for a user of the user device based on user information received from the user, and the associating the user account with the customer account.

16. The method of claim 15, wherein the customer account is generated for the user based on customer information received from the user, the customer information comprising payment information.

17. The method of claim 16, wherein the customer account is generated for a customer based on customer information received from the company administrator, the customer information comprising payment information.

18. The method of claim 10, further comprising:
- generating a service record comprising the service request, the quote, and a payment receipt showing the charge to the customer account; and
- storing the service record in association with the customer account.

* * * * *